(12) United States Patent
Nagano

(10) Patent No.: US 8,241,414 B2
(45) Date of Patent: Aug. 14, 2012

(54) WATER-BASED INK FOR INK-JET RECORDING, INK CARTRIDGE, AND INK-JET RECORDING APPARATUS

(75) Inventor: Taro Nagano, Nagoya (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 160 days.

(21) Appl. No.: 12/723,746

(22) Filed: Mar. 15, 2010

(65) Prior Publication Data

US 2010/0242794 A1 Sep. 30, 2010

(30) Foreign Application Priority Data

Mar. 26, 2009 (JP) ................................. 2009-076612

(51) Int. Cl.
*C09D 11/02* (2006.01)
(52) U.S. Cl. .................................................... 106/31.89
(58) Field of Classification Search ................. 106/31.89
See application file for complete search history.

(56) References Cited

U.S. PATENT DOCUMENTS

| 5,522,925 | A | 6/1996 | Chassot et al. |
| 5,609,671 | A | 3/1997 | Nagasawa |
| 5,837,045 | A | 11/1998 | Johnson et al. |
| 5,897,694 | A * | 4/1999 | Woolf ........................ 106/31.27 |
| H1967 | H * | 6/2001 | Woolf ............................ 427/288 |
| 6,709,095 | B2 * | 3/2004 | Sago et al. ..................... 347/100 |
| 6,880,928 | B2 | 4/2005 | Hosoi et al. |
| 2004/0226477 | A1 * | 11/2004 | Hoshi et al. ................. 106/31.86 |
| 2007/0186812 | A1 * | 8/2007 | Koga et al. .................. 106/31.58 |
| 2008/0241398 | A1 | 10/2008 | Kato et al. |

FOREIGN PATENT DOCUMENTS

| JP | 07-216251 | 8/1995 |
| JP | 08-003498 | 1/1996 |
| JP | 11-172170 | 6/1999 |
| JP | 2000-094825 | 4/2000 |
| JP | 2000-513396 | 10/2000 |
| JP | 2001-139850 | 5/2001 |
| JP | 2002-096547 | 4/2002 |
| JP | 2003-096351 | 4/2003 |
| JP | 2004-009678 | 1/2004 |
| JP | 2004-276253 | 10/2004 |
| JP | 2005-280311 | 10/2005 |
| JP | 2008-246821 | 10/2008 |

OTHER PUBLICATIONS

English Machine Translation of CN 101851445.*

* cited by examiner

*Primary Examiner* — Melvin C Mayes
*Assistant Examiner* — Veronica F Faison
(74) *Attorney, Agent, or Firm* — Banner & Witcoff, Ltd.

(57) ABSTRACT

The present invention provides a water-based ink for ink-jet recording including a pigment, water, an anionic surfactant represented by the following general formula (1), and complex salt forming an anionic zirconium complex ion.

$$R-O-(CH_2CH_2O)_n-X^-M^+ \qquad (1)$$

13 Claims, 2 Drawing Sheets

WATER-BASED INK FOR INK-JET RECORDING, INK CARTRIDGE, AND INK-JET RECORDING APPARATUS

CROSS-REFERENCE TO RELATED APPLICATION

This application claims priority from Japanese Patent Application No. 2009-76612 filed on Mar. 26, 2009. The entire subject matter of the Japanese Patent Application is incorporated herein by reference.

BACKGROUND

Heretofore, a water-based ink for ink-jet recording comprising a pigment and water has been used widely. When recording is performed with the water-based ink, permeability of the water-based ink relative to a recording medium affects greatly a drying ability of a recorded object. For the improvement of the drying ability of the recorded object, a surfactant or a penetrant may be added to the water-based ink to increase the permeability thereof relative to a recording medium by reducing surface tension of the water-based ink. However, when the permeability of the water-based ink relative to the recording medium is increased by reducing the surface tension of the water-based ink, an optical density (OD) value of the recorded object is decreased and printing quality may be decreased in this point.

As a method for increasing the optical density (OD) value of the recorded object, there is a method of preliminarily applying multivalent metal salt on the recording medium. According to such a method, since the pigment is aggregated very fast on the surface of the recording medium, the optical density (OD) value of the recorded object is increased. However, it takes time to apply the multivalent metal salt on the recording medium.

On the other hand, when the multivalent metal salt is directly added to the water-based ink, the time for preliminarily applying the multivalent metal salt is not required. However, in such a method, the pigment is aggregated in the water-based ink before recording, and unstable ejection of ink such as unejection or ejection deflection may occur at the time of ejecting the water-based ink from a nozzle.

SUMMARY

A water-based ink for ink jet recording is a water-based ink for ink jet recording comprising a pigment, water, an anionic surfactant represented by the general formula (1), and complex salt forming an anionic zirconium complex ion:

$$R\text{—}O\text{—}(CH_2CH_2O)_n\text{—}X^-M^+ \quad (1)$$

where in the general formula (1),
R represents a hydrophobic group,
$X^-$ represents an anionic group,
$M^+$ represents an alkali metal ion, an ammonium ion, or a quaternary ammonium ion, and
n represents an integer of 1 to 30.

Hereinafter, the anionic zirconium complex ion may also be referred to as the "anionic Zr complex ion". And hereinafter the complex salt may also be referred to as the "Zr complex salt."

An ink cartridge comprises the water-based ink for ink-jet recording.

An ink-jet recording apparatus comprises an ink storing portion and an ink ejecting unit. An ink stored in the ink storing portion is ejected by the ink ejecting unit. The ink cartridge is stored in the ink storing portion.

DETAILED DESCRIPTION

Figure 1:
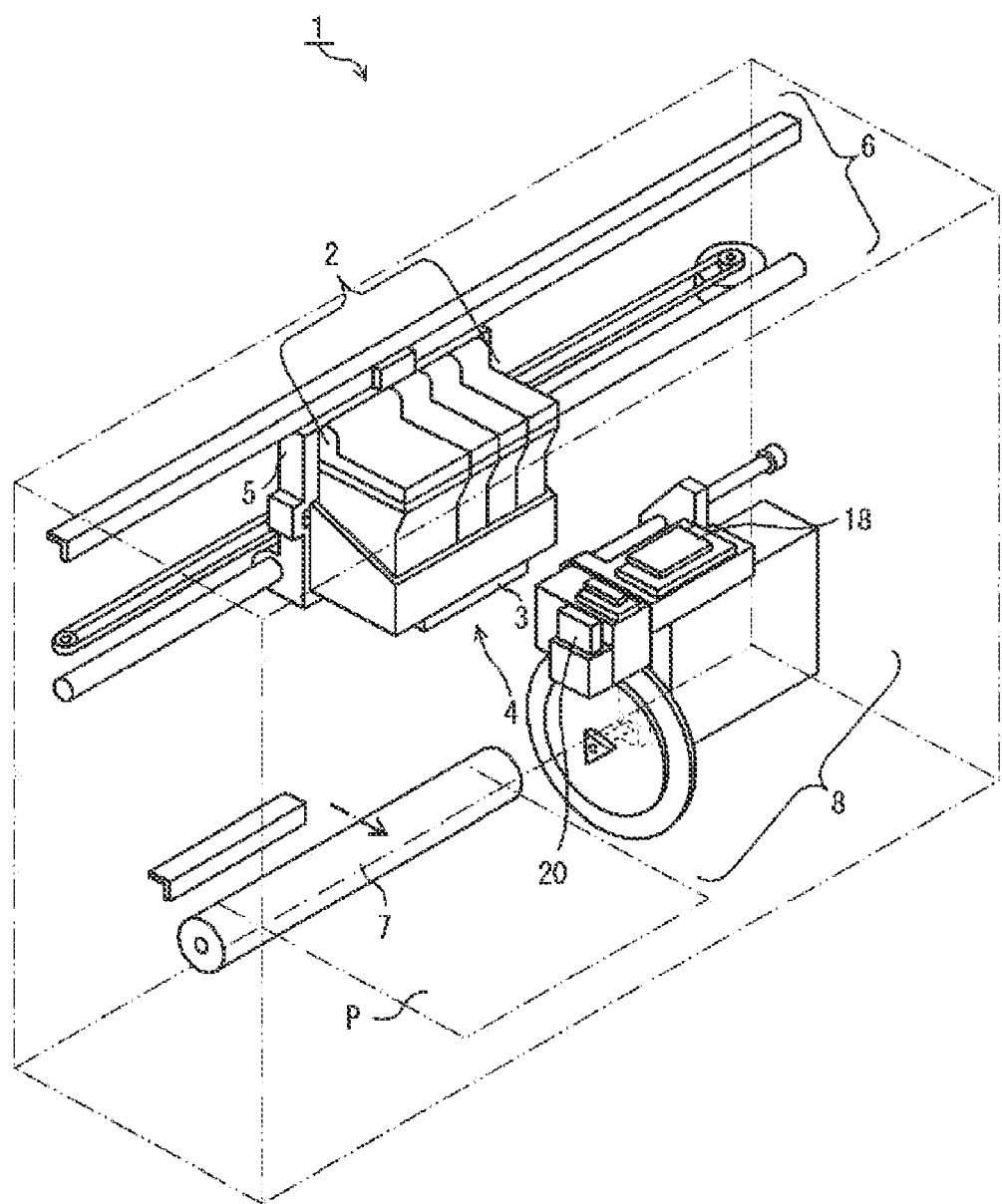
FIG. 1 is a schematic perspective view showing an example of the configuration of the ink-jet recording apparatus.

The water-based ink for ink-jet recording is explained. The water-based ink for ink-jet recording comprises a pigment, water, an anionic surfactant represented by the general formula (1), and the Zr complex salt. Hereinafter, the water-based ink for ink-jet recording may also be referred to simply as the "ink" or "water-based ink".

The pigment is not particularly limited and examples thereof include carbon blacks, inorganic pigments, organic pigments, and the like. Examples of the carbon black include furnace black, lamp black, acetylene black, channel black, and the like. Examples of the inorganic pigment include titanium oxide, an iron oxide inorganic pigment, a carbon black inorganic pigment, and the like. Examples of the organic pigment include azo pigments such as azo lake, an insoluble azo pigment, a condensed azo pigment, a chelate azo pigment, and the like; polycyclic pigments such as a phthalocyanine pigment, a perylene and perynone pigment, an anthraquinone pigment, a quinacridone pigment, a dioxazine pigment, a thioindigo pigment, an isoindolinone pigment, a quinophthalone pigment, and the like; dye lake pigments such as a basic dye lake pigment, an acid dye lake pigment, and the like; a nitro pigment; a nitroso pigment; an aniline black daylight fluorescent pigment; and the like. Further, other pigments may be used as long as they are dispersible to an aqueous phase. Examples of such pigments include C. I. Pigment Black 1, 6, and 7; C. I. Pigment Yellow 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Orange 31 and 43; C. I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blue 1, 2, 3, 15, 15:1, 15:2, 15:3, 15:4, 16, 22, and 60; C. I. Pigment Green 7 and 36; and the like.

A dispersant may be added to the water-based ink, if necessary. The dispersant is not particularly limited, and examples thereof include high-molecular weight polyurethane; polyester; a high molecular copolymer having a functional group such as a carbonyl group, an amino group, or the like, showing a strong affinity for pigments; and the like.

The pigment may include a self-dispersed pigment. The self-dispersed pigment is a pigment that is dispersible to water, without using a dispersant, by introducing at least one of hydrophilic functional groups such as a sulfonate group, a phosphate group, a carboxyl group, a carbonyl group, a hydroxyl group, and the like, and their salts into the surface of a pigment particle directly or through other groups by chemical bonding.

The self-dispersed pigment is not particularly limited. For example, a self-dispersed pigment having a surface treated by a method described in JP8 (1996)-3498A, JP2000-513396A, or the like, may be used. For example, a commercially available self-dispersed pigment may be used. Examples of the commercially available self-dispersed pigment include "CAB-O-JET® 200", "CAB-O-JET® 300", and "CAB-O-

JET® 400" (Cabot Specialty Chemicals, Inc.); "BONJET® BLACK CW-1", "BONJET BLACK CW-2", and "BONJET 8 BLACK CW-3" (Orient Chemical Industries, Ltd.); "LIO-JET® WD BLACK 002C" (TOYO INK MFG. CO., LTD.); and the like.

A pigment used as a raw material of the self-dispersed pigment is not particularly limited, and either an inorganic pigment or an organic pigment may be used. Examples of an inorganic pigment suitable to the surface treatment include carbon blacks such as "MA8" and "MA100" (Mitsubishi Chemical Corporation); "COLOR BLACK FW 200" (Evonik Degussa); and the like.

The solid content of the pigment relative to the total amount of the water-based ink (the proportion of the pigment in the ink; pigment solid content) is not particularly limited, and decided suitably according to a desired optical density, color, or the like. The proportion of the pigment in the ink is, for example, in the range from about 0.1 wt % to about 20 wt %, from about 1 wt % to about 10 wt %, and from about 2 wt % to about 8 wt %. One of the pigments may be used alone or two or more of them may be used in combination.

The water-based ink may comprise a coloring agent other than the pigment. Examples of the coloring agent other than the pigment include dyes and the like.

The water may be ion-exchange water or purified water. The amount of the water to be added relative to the total amount of the water-based ink (the proportion of the water in the ink) is decided suitably according to desired ink properties. The water may be the balance of the ink, excluding other components.

In the general formula (1), R represents a hydrophobic group. The R may be a straight chain alkyl group having 10 to 18 carbon atoms or a straight chain alkyl group having 10 to 16 carbon atoms.

In the general formula (1), $X^-$ represents an anionic group. The anionic group may be a $-SO_3^-$ group, although the anionic group is not limited thereto.

In the general formula (1), $M^+$ represents an alkali metal ion, an ammonium ion ($NH_4^+$), or a quaternary ammonium ion. Examples of the alkali metal ion include sodium ion ($Na^+$), lithium ion ($Li^+$), potassium ion ($K^+$), and the like. Examples of the quaternary ammonium ion include tetramethylammonium ion, tetraethylammonium ion, tetrabutylammonium ion, and the like.

In the general formula (1), n (the polymerization degree of polyoxyethylene) is 1 to 30, and is, for example, 1 to 15 or 1 to 9.

Examples of the anionic surfactant represented by the general formula (1) include polyoxyethylene alkyl ether type anionic surfactants. Commercially available products can be used as the anionic surfactant represented by the general formula (1). Examples of the commercially available product include "SUNNOL® NL-1430" and "SUNNOL® LMT-1430" (Lion Corporation); "EMAL® 20CM", "EMAL® 20C", "EMAL® E-27C", "EMAL® 270J" and "LATEMUL® E-150" (Kao Corporation); and the like.

The amount of the anionic surfactant represented by the general formula (1) to be added (in terms of an active ingredient amount) relative to the total amount of the water-based ink is, for example, in the range from about 0.01 wt % to about 1 wt %, from about 0.01 wt % to about 0.5 wt %, and from about 0.05 wt % to about 0.15 wt %. One of the anionic surfactants represented by the general formula (1) may be used alone, or two or more of them may be used in combination.

The water-based ink for ink-jet recording may comprise a surfactant other than the anionic surfactant represented by the general formula (1). The surfactant other than the anionic surfactant represented by the general formula (1) is not particularly limited, and examples thereof include acetylene glycol surfactants produced by Nissin Chemical Industry Co., Ltd. such as "OLFIN® E1004", "OLFIN® E1010", "SURFYNOL® 440", "SURFYNOL® 465", and the like; acetylene glycol surfactants produced by Kawaken Fine Chemicals Co., Ltd. such as "ACETYLENOL® E40", "ACETYLENOL® E100", and the like; anionic surfactants produced by Kao Corporation such as "VENOL®" series, "NEOPELEX®" series, NS SOAP, KS SOAP, OS SOAP, "PELEX®" series, and the like; anionic surfactants produced by Lion Corporation such as "LIPOLAN®" series, "LIPON®" series, "LIPOTAC®" series, "ENAGICOL®" series, "LIPAL®" series, "LOTAT®" series, and the like; nonionic surfactants produced by Kao Corporation such as "EMULGEN®" series, "RHEODOL®" series, "EMASOL®" series, "EXCEL®" series, "EMANON®" series, "AMIET®" series, "AMINON®" series, and the like; nonionic surfactants produced by Lion Corporation such as "DOBANOX®" series, "LEOCOL®" series, "LEOX®" series, "LAOL®" series, "LEOCON®" series, "LIONOL®" series, "CADENAX®" series, "LIONON®" series, "LEOFAT®" series, and the like; and the like. One of the surfactants other than the anionic surfactant represented by the general formula (1) may be used alone or two or more of them may be used in combination.

The Zr complex salt is a complex salt that forms the anionic Zr complex ion in a solution or in an ink.

The anionic Zr complex ion preferably has an anionic ligand. Examples of the anionic ligand include $CO_3^{2-}$ (carbonato), $OH^-$ (hydroxo), and the like. The anionic Zr complex ion may be $[Zr(CO_3)_2(OH)_2]^{2-}$. A counter ion in the Zr complex salt may be an alkali metal ion, ammonium ion ($NH_4^+$), or a quaternary ammonium ion. Examples of the alkali metal ion include sodium ion ($Na^+$), lithium ion ($Li^+$), potassium ion ($K^+$), and the like. Examples of the quaternary ammonium ion include tetramethylammonium ion, tetraethylammonium ion, tetrabutylammonium ion, and the like. Examples of the Zr complex salt include $K_2[Zr(CO_3)_2(OH)_2]$, $(NH_4)_2[Zr(CO_3)_2(OH)_2]$, and the like. For example, commercially available Zr complex salt may be used. Examples of the commercially available Zr complex salt include "ZIRMEL 1000" and "BAYCOAT 20" (Nippon Light Metal Co., Ltd.); and the like.

The solid content of the Zr complex salt relative to the total amount of the water-based ink is, for example, in the range from about 0.1 wt % to about 0.8 wt %, from about 0.1 wt % to about 0.6 wt %, and from about 0.1 wt % to about 0.4 wt %.

By using the anionic surfactant represented by the general formula (1) and the Zr complex salt in combination, the water-based ink for ink-jet recording achieves lower surface tension, higher optical density (OD) value regardless of high permeability, and favorable ejection stability. Although a mechanism for these improvements of the ink performance is unknown, it is speculated as follows. With respect to the water-based ink for ink-jet recording, when an electrolyte derived from the Zr complex salt exists in the ink, the anionic surfactant represented by the general formula (1) is activated, the surface tension is decreased, and the permeability is increased. Further, the concentration of the water-based ink for ink-jet recording is condensed during the process of penetrating to a recording medium such as a recording paper or the like. In this state, ether oxygen in the anionic surfactant represented by the general formula (1) has an electron donating property, and may become a neutral ligand. When the ether oxygen is substituted to the anionic ligand in the anionic Zr complex ion, the anionic Zr complex ion changes from an anion to a cation. As a result, aggregation of the pigment on the recording medium is promoted and the optical density (OD) value of a recorded object is increased. On the other hand, with respect to the water-based ink before recording, since the anionic Zr complex ion is an anion, the aggregation of the pigment does not occur and favorable ejection stability is achieved. However, the aforementioned mechanism for the improvements of the ink performance is mere estimation and does not limit the present invention at all.

It is considered that an improvement of the ejection stability can be seen markedly particularly in a water-based ink comprising the self-dispersed pigment in which a pigment is dispersed and stabilized only by charge repulsion as compared to a water-based ink comprising the dispersant in which a pigment is dispersed and stabilized by charge repulsion and steric repulsion.

The water-based ink for ink-jet recording may further comprise a humectant and a penetrant. The humectant prevents an ink from drying at a nozzle portion of an ink-jet head, for example. The penetrant adjusts the drying rate of an ink on a recording medium, for example.

The humectant is not particularly limited, and examples thereof include lower alcohols such as methyl alcohol, ethyl alcohol, n-propyl alcohol, isopropyl alcohol, n-butyl alcohol, sec-butyl alcohol, t-butyl alcohol, and the like; amides such as dimethylformamide, dimethylacetamide, and the like; ketones such as acetone and the like; ketoalcohols such as diacetone alcohol and the like; ethers such as tetrahydrofuran, dioxane, and the like; polyalcohols such as polyalkylene glycol, alkylene glycol, glycerin, and the like; 2-pyrrolidone; N-methyl-2-pyrrolidone; 1,3-dimethyl-2-imidazolidinone; and the like. The polyalkylene glycol is not particularly limited, and examples thereof include polyethylene glycol, polypropylene glycol, and the like. The alkylene glycol is not particularly limited, and examples thereof include ethylene glycol, propylene glycol, butylene glycol, diethylene glycol, triethylene glycol, dipropylene glycol, tripropylene glycol, thiodiglycol, hexylene glycol, and the like. One of the humectants may be used alone or two or more of them may be used in combination.

The amount of the humectant to be added relative to the total amount of the water-based ink (the proportion of the humectant) is not particularly limited, and is, for example, in the range from 0 wt % to about 95 wt %, from about 5 wt % to about 80 wt %, and from about 5 wt % to about 50 wt %.

The penetrant is not particularly limited, and examples thereof include glycol ethers. The glycol ethers are not particularly limited, and examples thereof include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone, or two or more of them may be used in combination.

The amount of the penetrant to be added relative to the total amount of the water-based ink (the proportion of the penetrant) is not particularly limited and is, for example, in the range from 0 wt % to about 20 wt %. Setting of the proportion of the penetrant in the aforementioned range makes it possible to achieve suitable permeability of the water-based ink relative to a recording medium such as a recording paper or the like. The proportion of the penetrant may be in the range from 0 wt % to about 15 wt % and from 0 wt % to about 10 wt %.

The water-based ink for ink-jet recording may further comprise a conventionally known additive as required. Examples of the additive include a viscosity modifier, a mildewproofing agent, and the like. Examples of the viscosity modifier include polyvinyl alcohols, celluloses, water-soluble resins, and the like.

The water-based ink for ink-jet recording may be prepared, for example, by uniformly mixing the pigment, water, the anionic surfactant represented by the general formula (1), and the Zr complex salt with other added components as required by a conventionally known method, and then removing sediments with a filter or the like.

The surface tension of the water-based ink for ink-jet recording is not particularly limited and is, for example, in the range from about 25 mN/m to about 45 mN/m and from about 30 mN/m to about 40 mN/m. The surface tension may be measured by the method mentioned in Examples described later.

Next, the ink cartridge is explained. As described above, the ink cartridge comprises the water-based ink for ink-jet recording. As a body of the ink cartridge, a conventionally known body may be used, for example.

Next, the ink-jet recording apparatus is explained. As described above, the ink-jet recording apparatus comprises an ink storing portion and an ink ejecting unit, and an ink stored in the ink storing portion is ejected by the ink ejecting unit. The ink cartridge is stored in the ink storing portion. Except for this, the ink-jet recording apparatus may have a configuration similar to that of, for example, a conventionally known ink-jet recording apparatus.

As shown in FIG. 1, the ink-jet recording apparatus 1 comprises four ink cartridges 2, an ink ejecting unit (ink-jet head) 3, a head unit 4, a carriage 5, a drive unit 6, a platen roller 7, and a purge device 8 as main components.

The four ink cartridges 2 contain inks of four colors, namely, yellow, magenta, cyan, and black, respectively. The ink-jet head 3 performs recording on a recording medium P such as a recording paper. The head unit 4 is provided with the ink jet head 3. The four ink cartridges 2 and the head unit 4 are mounted on the carriage 5. The drive unit 6 reciprocates the carriage 5 linearly. The platen roller 7 extends in the reciprocating direction of the carriage 5 and is arranged so as to face the ink-jet head 3. The recording includes recording of letters, images; printing; and the like.

The drive unit 6 reciprocates the carriage 5 in a straight line. A conventionally known drive unit (for example, JP2008-246821A) may be used as the drive unit 6.

The recording medium P is fed from a paper feeding cassette (not shown) positioned on a side of or underneath the ink-jet recording apparatus 1. The recording medium P is introduced between the ink-jet head 3 and the platen roller 7. Then, predetermined recording is performed on the recording medium P with the ink ejected from the ink-jet head 3. Thereafter, the recording medium P is discharged from the ink-jet recording apparatus 1. In FIG. 1, a feeding mechanism and a discharging mechanism of the recording medium P are not shown.

The purge unit 8 draws poor ink containing, for example, air bubbles trapped inside the ink-jet head 3. A conventionally known purge unit (for example, JP2008-246821A) may be used as the purge unit 8.

On the platen roller 7 side of the purge unit 8, a wiper member 20 is provided adjacent to the purge unit 8. The wiper member 20 has a spatula shape, and wipes a nozzle-formed surface of the ink-jet head 3 accompanying the movement of the carriage 5. In FIG. 1, a cap 18 covers plural nozzles of the ink-jet head 3, which returns to the reset position after the completion of recording, in order to prevent the inks from drying.

In the ink-jet recording apparatus, the four ink cartridges may be mounted to plural carriages. Alternatively, the four ink cartridges may be arranged and fixed in the ink-jet recording apparatus without being mounted on the carriage. In such an embodiment, for example, the ink cartridges and the head unit mounted to the carriage are connected via a tube or the like, and the inks are supplied to the head unit from the ink cartridges.

EXAMPLES

Examples of the present invention are described together with Comparative Examples. The present invention is neither limited nor restricted by the following Examples or Comparative Examples.

Examples 1 to 7 and Comparative Examples 1 to 10

Ink composition components (Tables 1 and 2) excluding dispersion of a self-dispersed pigment "CAB-O-JET® 300" were uniformly mixed to prepare ink solvents. Then, the ink solvents were each gradually added to the dispersion of the self-dispersed pigment and mixed uniformly. Thereafter, thus obtained mixtures were each filtered with a cellulose acetate type membrane filter having a pore diameter of 3.00 μm manufactured by Toyo Roshi Kaisha, Ltd. Thus, water-based inks for ink-jet recording of Examples 1 to 7 and Comparative Examples 1 to 10 were obtained.

Example 8 and Comparative Example 11

Ink composition components (Table 3) excluding dispersion of a self-dispersed pigment "CAB-O-JET® 400" were uniformly mixed to prepare ink solvents. Then, the ink solvents were each gradually added to the dispersion of the self-dispersed pigment and mixed uniformly. Thereafter, thus obtained mixtures were each filtered with a cellulose acetate type membrane filter having a pore diameter of 3.00 μm manufactured by Toyo Roshi Kaisha, Ltd. Thus, water-based inks for ink-jet recording of Example 8 and Comparative Example 11 were obtained.

Example 9 and Comparative Example 12

Ink composition components (Table 4) excluding dispersion of a self-dispersed pigment "CAB-O-JET® 200" were uniformly mixed to prepare ink solvents. Then, the ink solvents were each gradually added to the dispersion of the self-dispersed pigment and mixed uniformly. Thereafter, thus obtained mixtures were each filtered with a cellulose acetate type membrane filter having a pore diameter of 3.00 μm manufactured by Toyo Roshi Kaisha, Ltd. Thus, water-based inks for ink-jet recording of Example 9 and Comparative Example 12 were obtained.

With respect to each of the water-based inks of Examples and Comparative Examples, (a) an aggregation evaluation and (b) an optical density (OD) value evaluation were performed according to the following methods.

(a) Aggregation Evaluation

Figure 2:
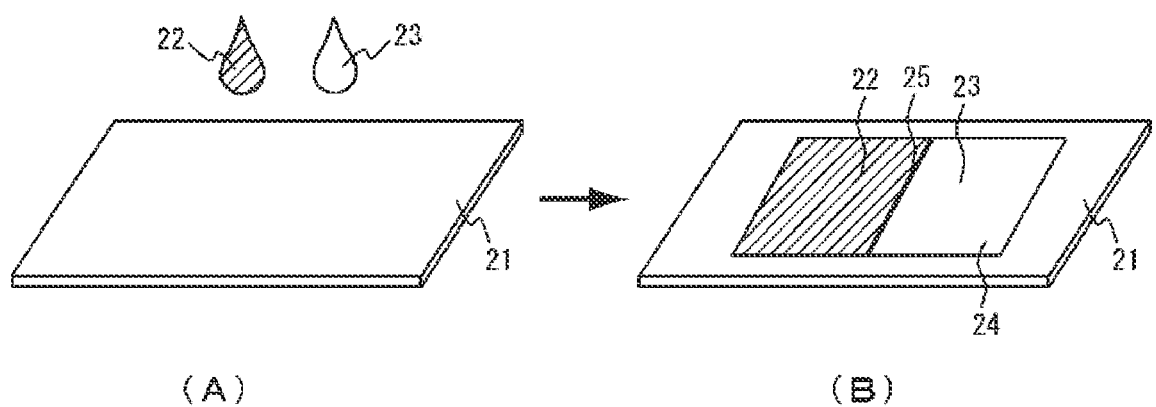
FIG. 2 is a view for explaining an aggregation evaluation method in examples.

First, 4 wt % dispersed liquids of the self-dispersed pigments used in Examples and Comparative Examples (pigment dispersed liquids) were prepared. Next, 0.2 wt % solutions of Zr complex salts or multivalent metal salts used in Examples and Comparative Examples were prepared. Then, as shown in FIG. 2(A), 3 μL of the pigment dispersed liquid 22 and 3 μL of the saline solution 23 were dropped on a glass slide 21. Thereafter, as shown in FIG. 2(B), by covering the dropped two solutions with a cover glass 24, the two solutions were brought into contact with each other. An interface 25 of the two solutions at a preparation made in this manner was observed with an optical microscope (200×), and evaluated according to the following evaluation criteria. At the time of ejecting a water-based ink from a nozzle, coarse aggregation substances may cause unstable ejection of inks such as unejection or ejection deflection. Therefore, it can be judged that the water-based ink is superior in ejection stability if the result of the aggregation evaluation is good.

Aggregation Evaluation Criteria

G: Coarse aggregation substance was not found at interface 25 of two solutions.

NG: Coarse aggregation substance was found at interface 25 of two solutions.

(b) Optical Density (OD) Value Evaluation

Using a digital multi-function center DCP-385C mounted an ink-jet printer manufactured by Brother Industries, Ltd., images each having a black monochrome patch were recorded on plain papers with water-based inks of Examples and Comparative Examples at a resolution of 600 dpi×600 dpi to prepare evaluation samples. Optical density (OD) values of the evaluation samples were measured with a spectrophotometer, Spectrolino (light source: $D_{50}$; observer: 2°; and status T), manufactured by GretagMacbeth. As for the plain papers, "Office paper" (plain paper 1) manufactured by FUJITSU Co WorCo LIMITED, "My paper" (plain paper 2) manufactured by Ricoh Co., Ltd., "Reytoday Copy" (plain paper 3) manufactured by International Paper Company, "Business" (plain paper 4) manufactured by XEROX CORPORATION, and "Recycled Supreme" (plain paper 5) manufactured by XEROX CORPORATION were used. The measurement of the optical density (OD) value was performed for two times with respect to each plain paper.

The ink compositions and the results of evaluations of the inks of Examples 1 to 7 are summarized in Table 1. The ink compositions and the results of evaluations of the inks of Comparative Examples 1 to 10 are summarized in Table 2. The ink compositions and the results of evaluations of the inks of Example 8 and Comparative Example 11 are summarized in Table 3. The ink compositions and the results of evaluations of the inks of Example 9 and Comparative Example 12 are summarized in Table 4. In Tables 1 to 4, the measurement results of the optical density (OD) values with respect to each plain paper are average values of the measurement performed twice. The averages shown in the lowest column are average values of the measurement results of the plain papers 1 to 5. Further, in Tables 1 to 4, the surface tension was measured with "CPVP-Z" (trade name) manufactured by Kyowa Interface Science Co., LTD.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Ink composition (wt %) | CAB-O-JET ® 300 (*1) | 26.65 (4.0) | 26.65 (4.0) | 26.65 (4.0) | 26.65 (4.0) | 26.65 (4.0) | 26.65 (4.0) | 26.65 (4.0) |
|  | Glycerin | 28.31 | 28.48 | 28.48 | 28.48 | 27.71 | 28.48 | 27.71 |
|  | SUNNOL ® NL-1430 (*2) | 0.40 (0.112) | — | — | 0.20 (0.056) | 0.20 (0.056) | 0.20 (0.056) | 0.20 (0.056) |
|  | SUNNOL ® LMT-1430 (*3) | — | 0.20 (0.054) | — | — | — | — | — |
|  | EMAL ® 20CM (*4) | — | — | 0.20 (0.05) | — | — | — | — |
|  | OLFIN ® E1010 (*5) | 0.15 | 0.15 | 0.15 | 0.15 | 0.15 | 0.15 | 0.15 |
|  | ZIRMEL 1000 (*6) | 0.5 (0.1) | 0.5 (0.1) | 0.5 (0.1) | 0.5 (0.1) | 1.8 (0.36) | — | — |
|  | BAYCOAT 20 (*7) | — | — | — | — | — | 0.5 (0.1) | 1.8 (0.36) |
|  | Water | Balance | Balance | Balance | Balance | Balance | Balance | Balance |
| Surface tension (mN/m) |  | 33.0 | 37.4 | 37.2 | 35.5 | 34.9 | 35.1 | 35.3 |
| Evaluation | Aggregation | G | G | G | G | G | G | G |
|  | Optical density (OD) value |  |  |  |  |  |  |  |
|  | Plain paper 1 (*8) | 1.16 | 1.22 | 1.17 | 1.21 | 1.19 | 1.22 | 1.18 |
|  | Plain paper 2 (*9) | 1.13 | 1.16 | 1.17 | 1.14 | 1.15 | 1.16 | 1.16 |
|  | Plain paper 3 (*10) | 1.11 | 1.15 | 1.10 | 1.13 | 1.13 | 1.13 | 1.14 |
|  | Plain paper 4 (*11) | 1.09 | 1.11 | 1.08 | 1.11 | 1.12 | 1.13 | 1.13 |
|  | Plain paper 5 (*12) | 1.12 | 1.17 | 1.13 | 1.16 | 1.14 | 1.15 | 1.16 |
|  | Average | 1.12 | 1.16 | 1.13 | 1.15 | 1.15 | 1.16 | 1.15 |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Ink composition (wt %) | CAB-O-JET ® 300 (*1) | 26.65 (4.0) | 26.65 (4.0) | 26.65 (4.0) | 26.65 (4.0) | 26.65 (4.0) | 26.65 (4.0) | 26.65 (4.0) | 26.65 (4.0) | 26.65 (4.0) | 26.65 (4.0) |
|  | Glycerin | 28.48 | 28.65 | 28.65 | 28.65 | 28.65 | 28.65 | 28.48 | 28.65 | 28.65 | 28.65 |
|  | SUNNOL ® NL-1430 (*2) | 0.40 (0.112) | — | — | — | — | — | — | 0.20 (0.056) | 0.20 (0.056) | 0.20 (0.056) |
|  | SUNNOL ® LMT-1430 (*3) | — | 0.20 (0.054) | — | — | — | — | — | — | — | — |
|  | EMAL ® 20CM (*4) | — | — | 0.20 (0.05) | — | — | — | — | — | — | — |
|  | NEOPELEX ® G-15 (*13) | — | — | — | 0.20 (0.032) | 0.20 (0.032) | — | — | — | — | — |
|  | OLFIN ® E1010 (*5) | 0.15 | 0.15 | 0.15 | 0.15 | 0.15 | 0.35 | 0.35 | 0.15 | 0.15 | 0.15 |
|  | ZIRMEL 1000 (*6) | — | — | — | — | 0.5 (0.1) | — | 0.5 (0.1) | — | — | — |
|  | ZrO(NO₃)₂•2H₂O (*14) | — | — | — | — | — | — | — | 0.10 | — | — |
|  | Zr(SO₄)₂•4H₂O (*15) | — | — | — | — | — | — | — | — | 0.10 | — |
|  | Al₂Cl₃•6H₂O (*16) | — | — | — | — | — | — | — | — | — | 0.10 |
|  | Water | Balance | Balance | Balance | Balance | Balance | Balance | Balance | Balance | Balance | Balance |
| Surface tension (mN/m) |  | 36.8 | 38.1 | 39.2 | 37.5 | 36.7 | 35.1 | 34.5 | Unmeasurable | Unmeasurable | Unmeasurable |
| Evaluation | Aggregation | G | G | G | G | G | G | G | NG | NG | NG |
|  | Optical density (OD) value |  |  |  |  |  |  |  |  |  |  |
|  | Plain paper 1 (*8) | 1.13 | 1.14 | 1.09 | 1.10 | 1.10 | 1.08 | 1.07 | Unmeasurable | Unmeasurable | Unmeasurable |
|  | Plain paper 2 (*9) | 1.10 | 1.06 | 1.05 | 1.08 | 1.08 | 1.05 | 1.00 |  |  |  |
|  | Plain paper 3 (*10) | 1.03 | 1.08 | 1.06 | 1.08 | 1.08 | 1.03 | 1.02 |  |  |  |
|  | Plain paper 4 (*11) | 1.09 | 1.07 | 1.10 | 1.07 | 1.07 | 1.08 | 1.10 |  |  |  |
|  | Plain paper 5 (*12) | 1.05 | 1.05 | 1.03 | 1.06 | 1.06 | 1.03 | 1.05 |  |  |  |
|  | Average | 1.08 | 1.08 | 1.07 | 1.08 | 1.08 | 1.05 | 1.05 |  |  |  |

TABLE 3

|  |  | Ex. 8 | Comp. Ex. 11 |
|---|---|---|---|
| Ink composition (wt %) | CAB-O-JET ® 400 (*17) | 26.65 (4.0) | 26.65 (4.0) |
|  | Glycerin | 28.48 | 27.98 |
|  | SUNNOL ® NL-1430 (*2) | 0.20 (0.056) | 0.20 (0.056) |
|  | OLFIN ® E1010 (*5) | 0.15 | 0.15 |
|  | ZIRMEL 1000 (*6) | 0.5 (0.1) | — |
|  | Water | Balance | Balance |
| Surface tension (mN/m) |  | 34.2 | 35.8 |
| Evaluation | Aggregation | G | G |

TABLE 3-continued

|  | Ex. 8 | Comp. Ex. 11 |
|---|---|---|
| Optical density (OD) value |  |  |
| Plain paper 1 (*8) | 1.23 | 1.18 |
| Plain paper 2 (*9) | 1.25 | 1.18 |
| Plain paper 3 (*10) | 1.30 | 1.25 |
| Plain paper 4 (*11) | 1.19 | 1.15 |
| Plain paper 5 (*12) | 1.19 | 1.16 |
| Average | 1.23 | 1.18 |

TABLE 4

|  |  | Ex. 9 | Comp. Ex. 12 |
|---|---|---|---|
| Ink composition (wt %) | CAB-O-JET ® 200 (*18) | 20.00 (4.0) | 20.00 (4.0) |
|  | Glycerin | 28.48 | 29.24 |
|  | SUNNOL ® NL-1430 (*2) | 0.20 (0.056) | 0.20 (0.056) |
|  | OLFIN ® E1010 (*5) | 0.15 | 0.15 |
|  | ZIRMEL 1000 (*6) | 0.5 (0.1) | — |
|  | Water | Balance | Balance |
|  | Surface tension (mN/m) | 34.3 | 34.6 |
| Evaluation | Aggregation | G | G |
|  | Optical density (OD) value |  |  |
|  | Plain paper 1 (*8) | 1.12 | 1.04 |
|  | Plain paper 2 (*9) | 1.07 | 1.00 |
|  | Plain paper 3 (*10) | 1.05 | 0.96 |
|  | Plain paper 4 (*11) | 1.00 | 1.05 |
|  | Plain paper 5 (*12) | 1.06 | 0.96 |
|  | Average | 1.06 | 1.00 |

FOOTNOTES OF TABLES 1 TO 4

*1: Dispersion of a self-dispersed pigment; pigment concentration=15 wt % (Cabot Specialty Chemicals, Inc.), numeric values in parentheses each indicate pigment solid content

*2: Polyoxyethylene alkyl ether sodium sulfate (Lion Corporation), active ingredient amount=28 wt %, numeric values in parentheses each indicate active ingredient amount

*3: Polyoxyethylene alkyl ether sodium sulfate (Lion Corporation), active ingredient amount 27 wt %, numeric value in parentheses indicates active ingredient amount

*4: Polyoxyethylene alkyl ether sodium sulfate (Kao Corporation), active ingredient amount=25 wt %, numeric value in parentheses indicates active ingredient amount

*5: Acetylene glycol surfactant (ethylene oxide (10 mol) additive of diol, Nissin Chemical Industry Co., Ltd.), active ingredient amount 100 wt %

*6: $K_2[Zr(CO_3)_2(OH)_2]$, 20 wt % solution (Nippon Light Metal Co., Ltd.), numeric values in parentheses each indicate solid content

*7: $(NH_4)_2[Zr(CO_3)_2(OH)_2]$, 20 wt % solution (Nippon Light Metal Co., Ltd.), numeric values in parentheses each indicate solid content

*8: Office paper (FUJITSU CoWorCo LIMITED)

*9: My paper (Ricoh Co., Ltd.)

*10: Reytoday Copy (International Paper Company)

*11: Business (XEROX CORPORATION)

*12: Recycled Supreme (XEROX CORPORATION)

*13: Alkyl benzene sodium sulfate, active ingredient amount=16 wt %, numeric values in parentheses each indicate active ingredient amount

*14: KANTO CHEMICAL CO., INC.

*15: KANTO CHEMICAL CO., INC.

*16: KANTO CHEMICAL CO., INC.

*17: Dispersion of a self-dispersed pigment; pigment concentration=15 wt % (Cabot Specialty Chemicals, Inc.), numeric values in parentheses each indicate pigment solid content

*18: Dispersion of a self-dispersed pigment; pigment concentration=20 wt % (Cabot Specialty Chemicals, Inc.), numeric values in parentheses each indicate pigment solid content As summarized in Table 1, the water-based inks of Example 1 to 7, in which an anionic surfactant represented by the general formula (1) and a Zr complex salt were used in a water-based ink in which the self-dispersed pigment "CAB-O-JET® 300" was used as a pigment, showed favorable results in both the aggregation evaluation and the optical density (OD) value evaluation. In contrast, as summarized in Table 2, the water-based inks of Comparative Examples 1 to 3, in which the Zr complex salt was not contained, each showed an optical density (OD) value lower than that of the water-based inks of Examples 1 to 7. The water-based ink of Comparative Example 4, in which the alkyl benzene sodium sulfate surfactant was used instead of the anionic surfactant represented by the general formula (1), and the Zr complex salt was not contained, showed an optical density (OD) value lower than that of the water-based inks of Examples 1 to 7. The water-based ink of Comparative Example 5, in which the alkyl benzene sodium sulfate surfactant was used instead of the anionic surfactant represented by the general formula (1), showed an optical density (OD) value lower than that of the water-based inks of Examples 1 to 7. The water-based ink of Comparative Example 6, in which the anionic surfactant represented by the general formula (1) and the Zr complex salt were not contained, showed an optical density (OD) value lower than that the water-based inks of Examples 1 to 7. The water-based ink of Comparative Example 7, in which the anionic surfactant represented by the general formula (1) was not contained, showed an optical density (OD) value lower than that the water-based inks of Examples 1 to 7. The water-based inks of Comparative Examples 8 to 10, in which the multivalent metal salt was used instead of the Zr complex salt, showed inferior results in the aggregation evaluation. In Comparative Example 10, even when salt of Al that is multivalent metal salt other than Zr was used, the ink showed an inferior result in the aggregation evaluation. It was found out that, also in the case of using salt of Fe, Ni, Mg, Cu, or Zn that was multivalent metal salt other than Zr and Al, the ink showed an inferior result in the aggregation evaluation. Further, in Comparative Examples 8 to 10, since the pigment was aggregated in the water-based ink, the surface tension measurement and the optical density (OD) value evaluation could not be performed.

As summarized in Table 3, the water-based ink of Example 8, in which an anionic surfactant represented by the general formula (1) and a Zr complex salt were used in a water-based ink in which the self-dispersed pigment "CAB-O-JET® 400" was used as a pigment, showed favorable results in both the aggregation evaluation and the optical density (OD) value evaluation. On the other hand, the water-based ink of Comparative Example 11, in which the Zr complex salt was not contained, showed an optical density (OD) value lower than that of the water-based ink of Example 8.

As summarized in Table 4, the water-based ink of Example 9, in which an anionic surfactant represented by the general formula (1) and a Zr complex salt were used in a water-based ink in which the self-dispersed pigment "CAB-O-JET® 200"

was used as a pigment, showed favorable results in both the aggregation evaluation and the optical density (OD) value evaluation. On the other hand, the water-based ink of Comparative Example 12, in which the Zr complex salt was not contained, showed an optical density (OD) value lower than that of the water-based ink of Example 9.

It will be obvious to those having skill in the art that many changes may be made in the above-described details of the particular aspects described herein without departing from the spirit or scope of the invention as defined in the appended claims.

What is claimed is:

1. A water-based ink for ink-jet recording, comprising:
a pigment;
water;
an anionic surfactant represented by the following general formula (1); and
complex salt forming an anionic zirconium complex ion:

$$R-O-(CH_2CH_2O)_n-X^-M^+ \quad (1)$$

where in the general formula (1),
R represents a hydrophobic group,
$X^-$ represents an anionic group,
$M^+$ represents an alkali metal ion, an ammonium ion, or a quaternary ammonium ion, and
n represents an integer of 1 to 30;
wherein the anionic zirconium complex ion is $[Zr(CO_3)_2(OH)_2]^{2-}$, and a counter ion in the complex salt is an alkali metal ion or a quaternary ammonium ion;
wherein the amount of the anionic surfactant represented by the general formula (1) to be added relative to the total amount of the water-based ink in the range from about 0.05 wt % to about 0.15 wt %; and
wherein the solid content of the complex salt relative to the total amount of the water-based ink is in the range from about 0.1 wt % to about 0.8 wt %.

2. The water-based ink for ink jet recording according to claim 1, wherein the pigment comprises a self-dispersed pigment.

3. The water-based ink for ink jet recording according to claim 1, wherein R in the general formula (1) represents a straight chain alkyl group having 10 to 18 carbon atoms.

4. The water-based ink for ink jet recording according to claim 1, wherein an anionic group ($X^-$) in the general formula (1) is a $-SO_3^-$ group.

5. The water-based ink for ink jet recording according to claim 1, wherein the amount of the anionic surfactant represented by the general formula (1) to be added relative to the total amount of the water-based ink is in the range from about 0.01 wt % to about 1 wt %.

6. The water-based ink for ink jet recording according to claim 1, wherein the solid content of the complex salt relative to the total amount of the water-based ink is in the range from about 0.1 wt % to about 0.4 wt %.

7. The water-based ink for ink jet recording according to claim 1, wherein $M^+$ in the general formula (1) is at least one selected from the group consisting of sodium ion, lithium ion, and potassium ion.

8. The water-based ink for ink jet recording according to claim 1, wherein $M^+$ in the general formula (1) is ammonium ion.

9. The water-based ink for ink jet recording according to claim 1, wherein the counter ion in the complex salt is at least one selected from the group consisting of sodium ion, lithium ion, and potassium ion.

10. The water-based ink for ink jet recording according to claim 1, wherein the counter ion in the complex salt is potassium ion.

11. The water-based ink for ink jet recording according to claim 1, wherein the counter ion in the complex salt is ammonium ion.

12. An ink cartridge comprising a water-based ink for ink jet recording, wherein the water-based ink is the water-based ink for inkjet recording according to claim 1.

13. An ink jet recording apparatus comprising:
an ink storing portion; and
an ink ejecting unit, an ink stored in the ink storing portion being ejected by the ink ejecting unit, wherein the ink cartridge according to claim 12 is stored in the ink storing portion.

* * * * *